United States Patent
Halstead et al.

(10) Patent No.: US 6,857,500 B2
(45) Date of Patent: Feb. 22, 2005

(54) TORQUE SENSOR

(75) Inventors: Kirk J. Halstead, Pleasant Ridge, MI (US); Edward J. Nixon, Saginaw, MI (US); Bryan N. Dennis, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 106 days.

(21) Appl. No.: 10/431,026

(22) Filed: May 6, 2003

(65) Prior Publication Data

US 2004/0222034 A1 Nov. 11, 2004

(51) Int. Cl.$^7$ ................................................. B62D 5/00
(52) U.S. Cl. .................................. 180/446; 73/862.236
(58) Field of Search ................................ 180/444, 446; 73/862.235, 862.236, 862.237, 862.238, 862.239

(56) References Cited

U.S. PATENT DOCUMENTS

| | | | | |
|---|---|---|---|---|
| 4,598,787 A | * | 7/1986 | Drutchas | 180/444 |
| 4,898,258 A | * | 2/1990 | Ohe et al. | 180/444 |
| 4,899,596 A | * | 2/1990 | Janik et al. | 73/862.329 |
| 4,905,524 A | * | 3/1990 | Dressler et al. | 73/862.041 |
| 5,010,970 A | * | 4/1991 | Yamamoto | 180/444 |
| 5,195,383 A | * | 3/1993 | Tanaka et al. | 73/862.325 |
| 5,400,663 A | * | 3/1995 | Bridges | 73/862.326 |
| 5,668,722 A | | 9/1997 | Kaufmann et al. | 701/41 |
| 6,190,264 B1 | | 2/2001 | Al-Rawi | 464/185 |
| 6,289,748 B1 | | 9/2001 | Lin et al. | |
| 6,363,305 B1 | | 3/2002 | Kaufmann et al. | 701/41 |
| 6,370,460 B1 | | 4/2002 | Kaufmann et al. | 701/41 |
| 6,389,338 B1 | | 5/2002 | Chandy et al. | |
| 6,427,307 B1 | * | 8/2002 | Al-Rawi | 29/407.05 |
| 6,465,975 B1 | | 10/2002 | Naidu | |
| 6,546,816 B2 | * | 4/2003 | Schlabach | 73/862.326 |
| 6,666,293 B2 | * | 12/2003 | Kogiso | 180/444 |

* cited by examiner

Primary Examiner—Lesley D. Morris
Assistant Examiner—Paul Royal, Jr.
(74) Attorney, Agent, or Firm—Michael D. Smith

(57) ABSTRACT

A torque sensor apparatus and method for use with an automotive steering system is disclosed. The torque sensor apparatus includes a shaft having a primary shaft coaxially connected to a secondary shaft and a first substrate operably connected to the primary shaft oriented substantially perpendicular to an axis defining the shaft. A second substrate is operably connected to the secondary shaft oriented substantially perpendicular to the axis. First and second substrates each have an aperture therethrough configured to receive an alignment pin therethrough. First and second substrates are substantially parallel to each other defining an electrical interface therebetween that is configured to generate a signal indicative of an amount of torque applied to the shaft. A housing is configured to enclose the first and second substrates having the electrical interface therebetween, wherein one side of the housing includes an alignment aperture therethrough positioned to align with the apertures of the first and second substrates having the alignment pin therethrough and extending from an exterior of the housing. The alignment aperture is configured to limit contact with the alignment pin disposed between edges defining the alignment aperture in the housing while allowing the alignment pin to align the apertures of the first and second substrates with the alignment aperture.

24 Claims, 6 Drawing Sheets

TORQUE SENSOR

TECHNICAL FIELD

This invention relates to an automotive steering system with a torque sensor.

BACKGROUND OF THE INVENTION

Current methods of measuring the torque applied to an automotive column shaft are of the compliant kind and are typically accomplished by use of a torsion bar as part of the shaft, joining an upper and lower section thereof. The torsion bar is made of material with known mechanical properties and hence has known compliance. Thus, the applied torque can be calculated from a measured angular displacement, Δθ, of the torsion bar (usually in the range of plus or minus a few degrees). The calculated torque is applied to a controller which then directs an electric steering torque assist motor to provide assist torque to the column shaft.

The torque sensor device may be used to accurately measure the input torque acting on a steering column shaft in an electronic power steering (EPS) system or steer-by-wire system of a vehicle. In this application, an input torque acts on the steering column shaft when an operator turns the steering wheel. The steering column shaft includes a primary shaft and a secondary shaft. The primary and secondary shafts are connected by a torsion bar. The rotation of the primary shaft relative to the secondary shaft may be measured with a potentiometer.

Typically in the assembly of such a torque sensor device the primary shaft is operably connected to a first substrate and the secondary shaft is connected to a second substrate. The primary and secondary shafts are operably coupled by a torsion bar. Each of the first and second substrates are aligned with each other using a pin extending through an aperture in a housing containing the sensor substrates to maintain alignment while assembly with the respective primary and secondary shaft assembly. The alignment pin prevents rotation of the substrates with respect to each other and with respect to the housing during assembly. During assembly of the torque sensor, the aperture in the housing is aligned with the openings in each of the substrates to receive the alignment pin. After assembly and installation of the torque sensor to the steering column shaft, the alignment pin is slidably removed from the respective parts in an attempt to have a sensor offset after such assembly of 50 percent plus or minus 4.5 percent of the source voltage, for example Vcc (2.50 V+/−0.225V) assuming Vcc=5V.

However, due to dimensional stack up tolerances during assembly of the first and second PCB's within the housing having the alignment pin extending through each, when the pin is removed from each corresponding aperture, the required offset voltage requirement between the PCB's may be defeated by removal of the pin to allow rotation of both first and second PCB's with respect to the housing in which they are contained. The required offset is defeated because the alignment pin preventing rotation of the components also stores mechanical energy therein caused by the misalignment as a result of the stack up condition. When the pin is removed, the stored mechanical energy in the pin is reflected in rotation of the now unrestricted components, thus defeating the offset. It has been found that any deviation from the preferred offset of zero degrees greater than 0.9 degrees of the system components will cause a failure of the offset voltage requirement based on a sensor having a sensor resolution of 0.25 Volts/degree, for example.

Thus, it is desired to provide a torque sensor that will be more forgiving of assembly tolerance stack conditions, such that a required offset voltage is not affected when the alignment pin is removed after assembly. It is advantageous to provide a simplified torque sensor assembly for direct sensing of the torque applied to a shaft to which the sensor is connected. In particular it is desirable to provide a torque sensor that will accommodate larger stack tolerances when the first and second torque sensing substrates are assembled within the housing and the alignment pin is installed to prevent rotation and set the required voltage offset, such that when the pin is removed, the offset isn't affected by the mechanical energy stored in the pin as a result of the tolerance stack between the sensor and housing.

SUMMARY OF THE INVENTION

A torque sensor apparatus and method for use with an automotive steering system is disclosed. The torque sensor apparatus includes a shaft having a primary shaft coaxially connected to a secondary shaft and a first substrate operably connected to the primary shaft oriented substantially perpendicular to an axis defining the shaft. A second substrate is operably connected to the secondary shaft oriented substantially perpendicular to the axis. First and second substrates each have an aperture therethrough configured to receive an alignment pin therethrough. First and second substrates are substantially parallel to each other defining an electrical interface therebetween that is configured to generate a signal indicative of an amount of torque applied to the shaft. A housing is configured to enclose the first and second substrates having the electrical interface therebetween, wherein one side of the housing includes an alignment aperture therethrough positioned to align with the apertures of the first and second substrates having the alignment pin therethrough and extending outside the housing. The alignment aperture is configured to limit contact with the alignment pin disposed between edges defining the alignment aperture in the housing while allowing the alignment pin to align the apertures of the first and second substrates with the alignment aperture.

DESCRIPTION OF THE DRAWINGS

Reference is made to the drawings wherein like elements and features are numbered alike and wherein.

DESCRIPTION OF THE PREFERRED EMBODIMENTS

This invention discloses a general type of torque sensor. In particular, the sensor may be useful to measure torque for electric power steering and/or steer-by-wire applications. The sensor is operably coupled with a rotating shaft to which torque is applied. In one embodiment described more fully below, the application of torque to a primary shaft of a column shaft is translated to a torsion bar to which the torsion bar is connected. The rotation of the torsion bar relative to the primary shaft changes the resistance of a potentiometer which generates a signal indicative of the torque transmitted from the primary shaft to the sensing device. The sensing device responds to changes in resistance from an offset resistance between a rotor and stator operably connected to the torsion bar and primary shaft, respectively, in the form of a measurable change in resistance. An electronic circuit converts the change in resistance into a voltage output signal that is linearly related to torque.

The invention features easy manufacturability and low cost. In addition, is suitable to fit different applications; namely the sensor can operate with steering systems that are non-compliant, highly compliant, or that may possess a compliance therebetween, depending on the requirements of the application.

Figure 1:
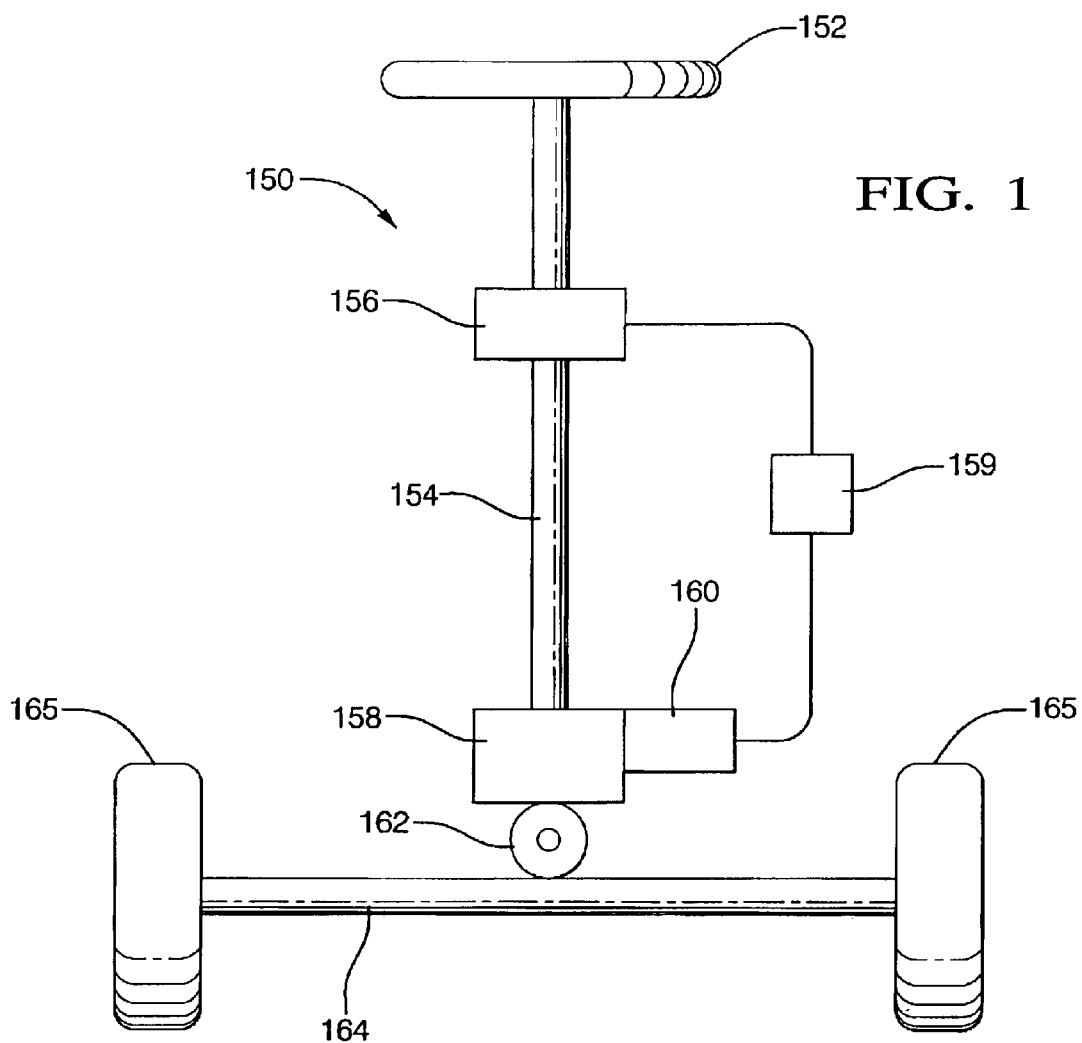
FIG. 1 is a block diagram illustrating the main components of a steering assembly for a motor vehicle utilizing a sensor assembly in accordance with the present invention.

Referring to FIG. 1, a block diagram of an electronic power assisted rack and pinion steering system 150 for a vehicle using a torque sensor device of the present invention is illustrated. The steering system 150 includes a steering wheel 152, column shaft 154, sensor assembly 156, steering gear 158, servo motor 160, controller 159, pinion 162, and rack 164, and tires 165. The steering wheel 152 is coupled to one end of the column shaft 154, and the opposite end of the column shaft 154 is coupled to the steering gear 158. The other end of the steering gear 158 is connected to the pinion 162 which is rotatively coupled to the rack 164 such that an operator turning the steering wheel 152 causes the pinion 162 to rotate along the rack 164. The rack 164 moves longitudinally and turns the tires 166 of the automobile. The servo motor 160 is connected to the steering gear 158 to provide power assist. The sensor assembly 156 is coupled to the column shaft 154 and accurately determines the angular position of the column shaft 154 and the input torque acting on the shaft 154 when the operator turns the steering wheel 152. The sensor assembly 156 is electrically coupled to the controller 159. Based on the data from the sensor assembly 156, the controller 159 processes the data and directs the rotational direction and power output of the servo motor 160 such that a larger torque input results in providing more power to the servo motor 160. Thus, the steering system 150 provides an appropriate level of power assistance to aid in steering.

Many other types of power steering systems exist such as a recirculating ball system comprising a steering gear in the form of a recirculating ball unit. The recirculating ball unit is connected to the column shaft at one end and to an idler arm at the other end. The idler arm is connected to a center link, and the center link is connected to the wheels of the automobile or truck. The present invention is intended to work equally well with either type of power steering system. Furthermore, although an EPS steering system has been described, it is also contemplated that sensor assembly 156 may be employed in a steer-by-wire system, where the mechanical connection of shaft 154 is absent from steering sensor 156 to steering gear 158.

Figure 2:
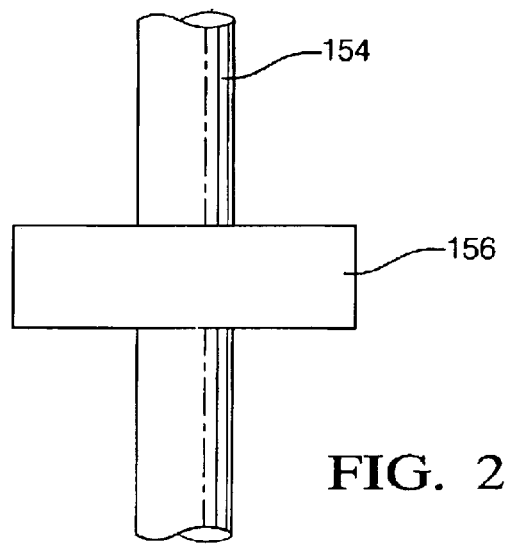
FIG. 2 is a perspective view of an exemplary embodiment of a sensor assembly coupled to a column shaft in accordance with the present invention.
Figure 3:
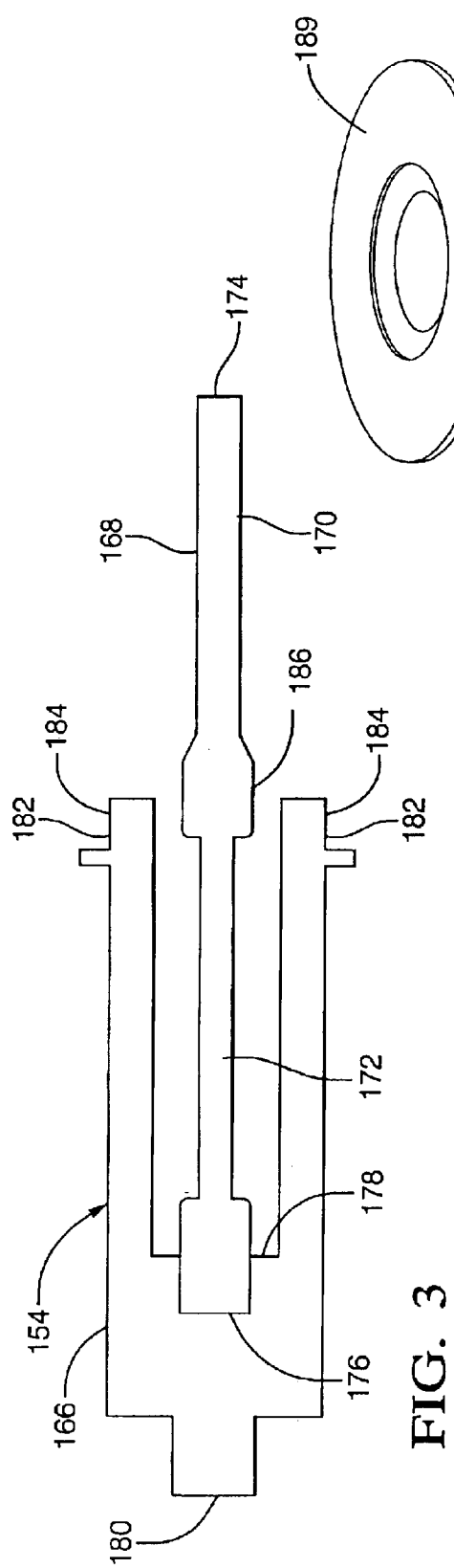
FIG. 3 is a schematic cross-sectional view taken through the column shaft along line 2—2 of FIG. 2.
Figure 4:
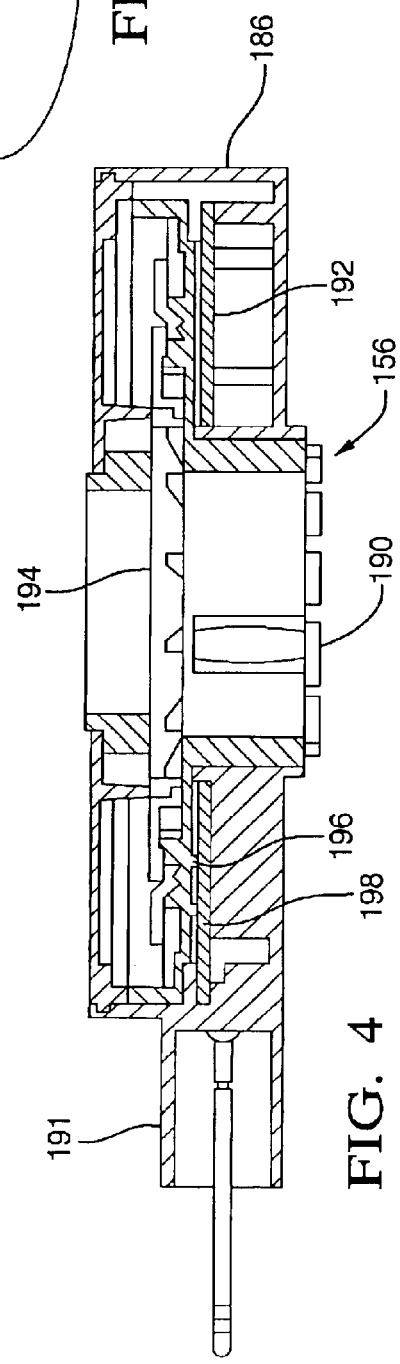
FIG. 4 is a cross-sectional view of the sensor assembly of FIG. 2.

Referring to FIGS. 2–4, the sensor assembly 156 is shown coupled to the column shaft 154. The column shaft 154 may include a primary shaft or primary bar 166 and a torsion bar 168. A portion of the primary bar 166 is hollow so that it may accept a portion of the torsion bar 168. The primary bar 166 has a length of about 9 inches, an outer diameter of about 1 inch, and a bore diameter slightly larger than 0.6 inch. The torsion bar 168 has a length of about 11 inches and includes a thick portion 170 and a thin portion 172. In the embodiment shown in the drawings, the thick 170 and thin portions 172 of the torsion bar 168 are integrally formed. A first end 174 of the torsion bar 168 is connected to the steering wheel 152, while the second end 176 is connected to an inner end portion 178 of the primary bar 166. The second end 180 of the primary bar 166 is connected to the steering gear 158. The first end 182 of the primary bar 166 includes a first adapter 184 for coupling with the sensor assembly 156. In a similar fashion, the thick portion 170 of the torsion bar 168 (near the connection of the thick 170 and thin portion 172) includes a second adapter 186 for coupling with the sensor assembly 156. The first 184 and second adapter 186 are positioned adjacent to each other.

In the embodiment shown in the drawings, the column shaft 154 is formed of a substantially solid and continuous construction. Preferably, the column shaft 154 is made from a high strength metal such as carbon steel. It should be noted that other materials exhibiting similar qualities may also be used to form the column shaft such as aluminum, titanium, magnesium, polymers, and the like. The column shaft may be sized and shaped in other forms to accommodate different purposes. For typical automobiles, a relatively short and thin column shaft would be preferable such as the embodiment shown in FIGS. 2–4. Larger and thicker column shafts would be more appropriate for larger vehicles such as trucks and off-road vehicles requiring heavy duty column shafts. The column shaft may also be configured with a non-circular cross-section such as a square, oval, octagon, or any other shape.

Figure 5:
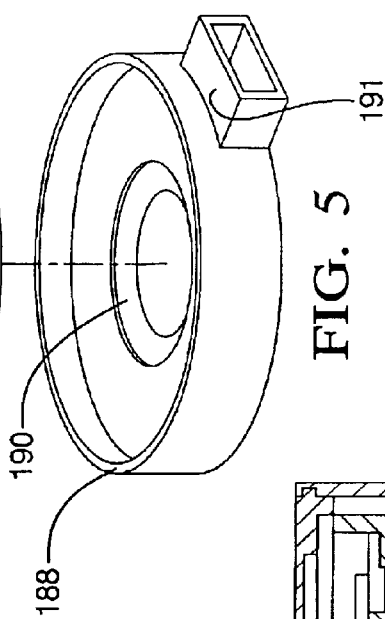
FIG. 5 is a-perspective view of a housing and rear lid for the sensor assembly shown in FIG. 2.

The sensor assembly 156 includes an angular-position sensing unit and a torque sensing apparatus enclosed in a housing 188 and a rear lid 189. Referring to FIG. 5, the housing 188 is disc shaped with a centrally located circular opening 190 which accepts and engages with the first 184 and second adapter 186 of the column shaft 154. The housing 188 has an outer diameter of about 3 inches and a thickness of about 0.7 inch. The opening has a diameter of about 1 inch.

The housing 188 includes a rectangularly shaped interface portion 191 protruding outwardly from the disc shaped housing. The interface portion 191 accepts a wiring harness (not shown) which includes a plurality of wires which interconnect the sensor assembly to the controller.

Referring to FIG. 4, the angular-position sensing unit includes a circular potentiometer which determines the angular position of the column shaft 154. The potentiometer comprises an element assembly 192, a position rotor 194, and a plurality of position sensor brushes 196. The element assembly 192 includes a position substrate 198 formed from alumina and has a diameter of about 3 inches and a thickness of about 40 mils.

Figure 6:
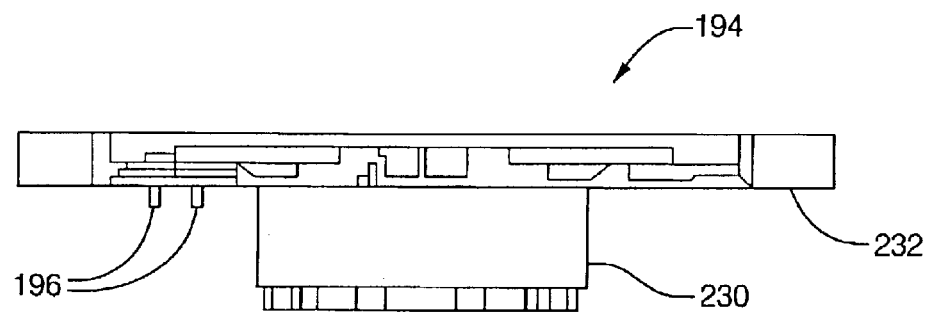
FIG. 6 is a cross-sectional view of a position rotor for the sensor assembly shown in FIG. 2.

Referring to FIGS. 6, the position rotor 194 is substantially a disc shaped member with a hub 230 extending outwardly from the bottom side 232. The position rotor 194 is rotatably mounted to the housing 188 such that the circular opening 190 of the housing 188 accepts the hub 230 of the position rotor 194. The position rotor 194 is electrically interconnected to the position substrate 198 by the plurality of position sensor brushes 196 which are attached to the bottom side 232 of the position rotor 194.

Figure 7A:
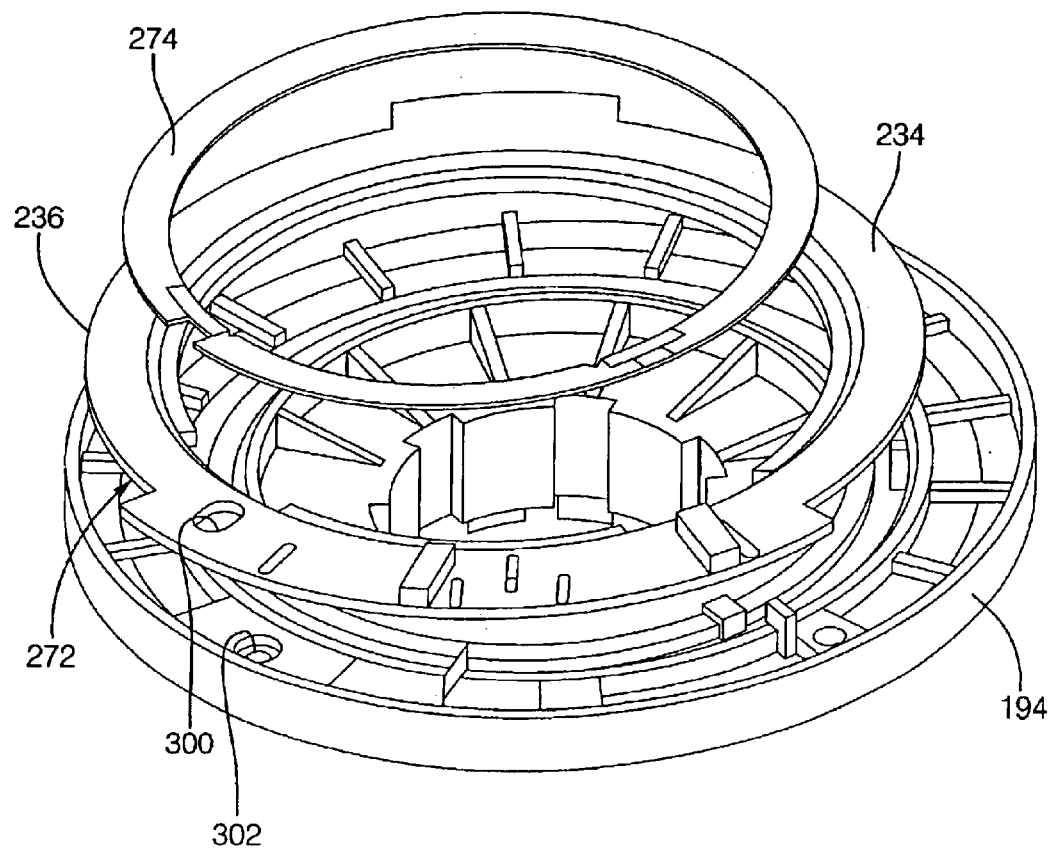
FIGS. 7A and 7B are exploded perspective views of a rotor assembly for the sensor assembly shown in FIG. 2.
Figure 7:
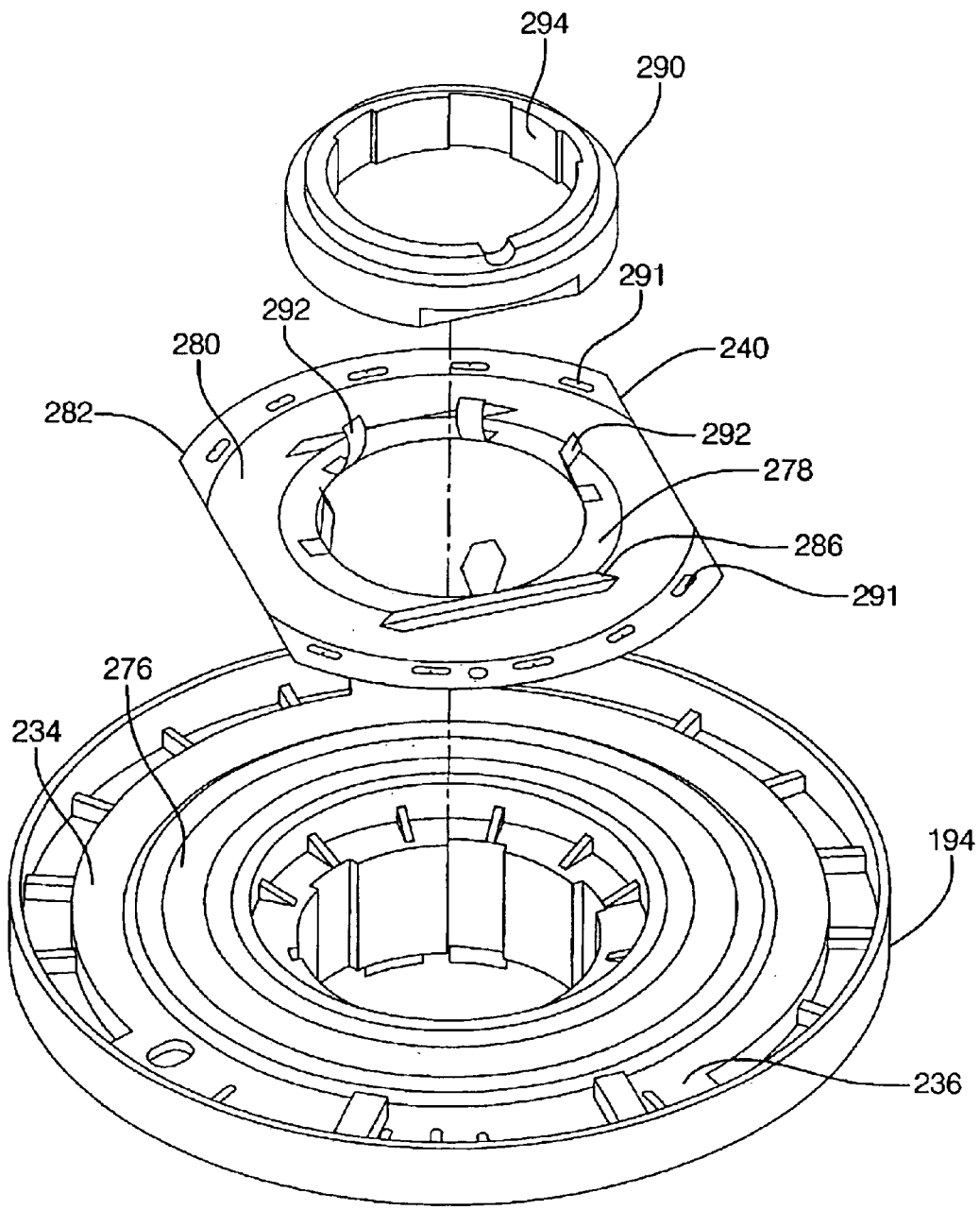

Referring to FIGS. 7A and 7B, the torque sensing unit includes a potentiometer which determines the angular position of torsion bar 168 relative to the angular position of the primary bar 166. The potentiometer for the torque sensing unit comprises a torque element 234, the position rotor 194, a rotor ring 236, a plurality of torque sensor brushes (not shown), a coupling 240, and a torque rotor 290.

Referring to FIG. 7A, the rotor ring 236 has an outer diameter of about three inches and is rotatively mounted to the top side 238 of the position rotor 194 so that the rotor ring 236 is able to rotate relative to the position rotor 194. A plurality of torque sensor brushes (not shown) are attached to the bottom side 272 of the rotor ring 236 and slidingly contact corresponding resistive patterns on position rotor 194, respectively. The rotor ring 236 is held in place by a retaining ring 274, and the retaining ring 274 is covered by an adapter ring 276. Both the retainer ring 274 and adapter ring 276 are formed from 7075-T6 aluminum.

Referring to FIG. 7B, the coupling 240 has an inner ring member 278, an outer ring member 280, and a base ring member 282. The inner ring member 278 is connected to the outer ring member 280, which in turn, is connected to the base ring member 282. The base ring member 282 is fixedly secured to the top side of the adapter ring 276 such that the base ring member 282 is fixedly connected to the rotor ring 236. At the connections of the inner 278 and outer ring member 280 are formed perpendicularly projecting lateral rails 286. Similarly, at the connections of the outer 280 and base ring members 282 are formed perpendicularly projecting longitudinal rails (not shown). The torque rotor 290 is fixedly connected to the inner ring member 278, and the torque rotor 290 engages and is fixedly secured to the second adapter 186 of the torsion bar 168 such that a rotation of the torsion bar 168 about the z axis results in an equal rotation of the torque rotor 290, coupling 240, and rotor ring 236.

The base ring member 282 may be secured to the adapter ring 276 with an adhesive (not shown). To further aid in the securement, the base ring member 282 may provided with a plurality of slots 291 which allow any excess adhesive to escape the interface of the base ring member 282 and adapter ring 276. In a similar fashion, the inner ring member 278 may include a plurality of slots 291 to further aid in the securement of the inner ring member 278 to the torque rotor 290. In addition, the inner ring member 278 includes a plurality of fingers 292 extending outwardly which fasten onto an inner wall 294 of the torque rotor 290.

In the particular embodiment shown in the drawings and herein described, the housing 188, rear lid 189, position rotor 194, rotor ring 236, and torque rotor 290 are each formed of a substantially solid and continuous construction. In addition, the position and torque substrates may be formed from non-ceramic materials such as a printed circuit boards (PCB), printed wiring board (PWB), polyglass substrate, or any other type known in the art. The slip rings, resistive rings, resistive patterns, and termination patterns may be formed by non-thick film processes such as thin film processes utilizing photolithographic techniques or the like.

Figure 8:
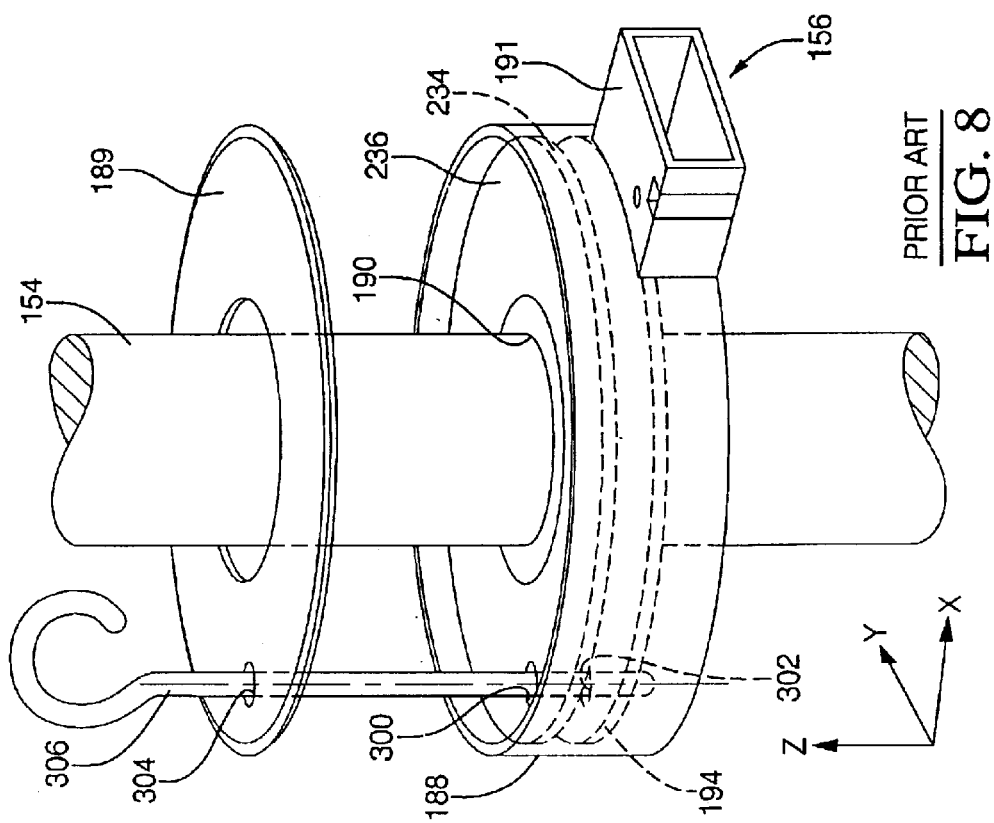
FIG. 8 is a perspective view of a prior art sensor assembly illustrating a prior art alignment aperture in the lid thereof.

Referring again to FIG. 7A, rotor ring 236 includes an opening 300 aligned with an opening 302 configured in position rotor 194 upon assembly therebetween in housing 188 and lid 189. More particularly with specific reference to FIG. 8, a prior art sensor assembly 156 is illustrated. Rotor ring 236 and position rotor 194 are aligned with each other via respective openings 300, 302 configured in each after disposing the same within housing 188. Lid 189 is defined with an alignment aperture 304 configured to receive an alignment pin 306 therethrough and be received in openings 300 and 302. In this manner, upon further assembly of sensor assembly 156 with column shaft 154 or further installation with the vehicle, a required offset voltage can be maintained, such that after assembly and installation of the torque sensor device, the required offset voltage is not disturbed and results in about 50 percent of the Vcc voltage available. However, because of tolerance stack between housing 188 and lid 189, alignment of opening 300 and 302 may not align with alignment aperture 304 in lid 189 when lid is assembled to housing 188. In the event, that dimensional stack up creates misalignment between openings 300, 302 and aperture 304, alignment pin 306 in effect stores mechanical energy that is caused by a periphery defining pin 306 abutting edges defining each of the openings 300, 302 and aperture 304 forcibly aligned with each other upon insertion of pin 306. When pin 306 is removed, the stored mechanical energy in pin 306 is reflected in misalignment of openings 300, 302 and aperture 304, thus upsetting the offset voltage reference to detect torque when column shaft 154 is rotated in either direction. Any offset deviation greater than 0.9 degrees between the system components causes a failure of the offset voltage requirement (i.e., based on a sensor resolution of 0.25 Volts/degree).

Figure 9:
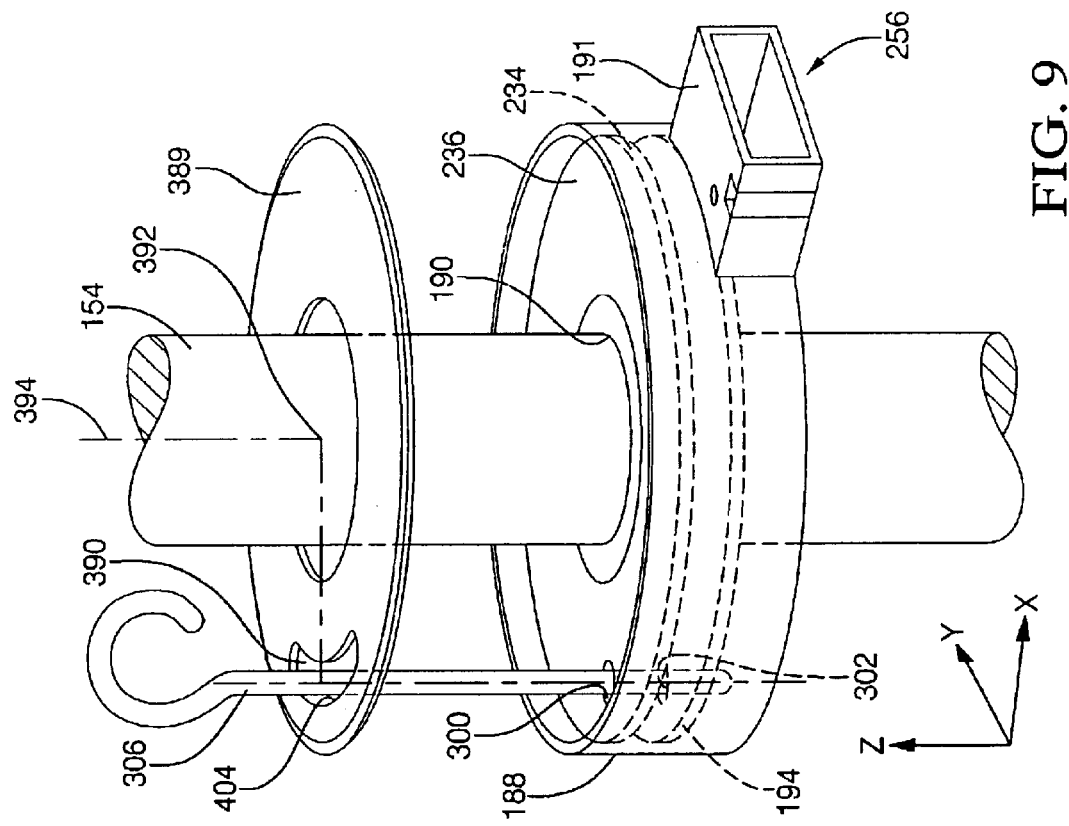
FIG. 9 is a perspective view of an exemplary embodiment of the sensor assembly of FIG. 2 illustrating an elongated and oversized aperture for an alignment pin to be received therethrough.

In an exemplary embodiment of a sensor assembly 256 illustrated in FIG. 9, a floating pin design with respect to a lid 389 is depicted such that this configuration will accommodate larger stack tolerances between the housing assembly and torsion bar or primary bar position with respect to the sensor assembly (e.g., rotor ring 236 and position rotor 194) having the sensor anti-rotation device or pin 306 disposed therewith. More specifically, lid 389 includes an elongated aperture 404 being dimensioned to allow a periphery defining pin 306 substantially no contact with edges defining aperture 389. Furthermore, elongated aperture 389 is preferably crescent shape to follow an arc 390 created in lid 389 if pin 306 were allowed to rotate about center 392 coinciding with an axis 394 about which shaft 154 rotates. The above configuration allows the sensor to find a "home assembly position" while maintaining the offset voltage requirement (e.g., 2.5V+/−0.225 V when Vcc+5.0 V) when alignment pin 306 is removed.

Figure 10:
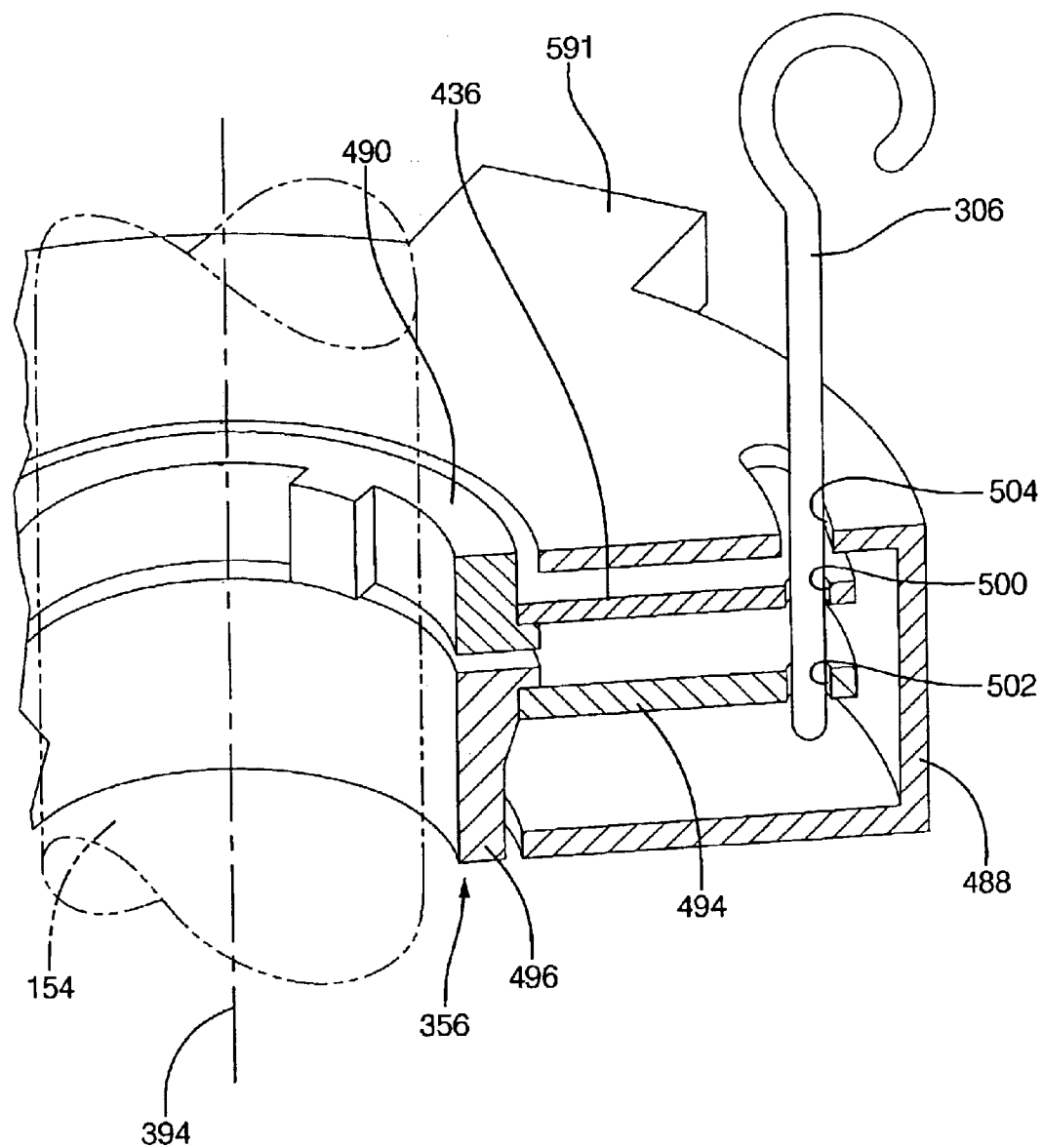
FIG. 10 is a cross-sectional view of another alternative embodiment of the sensor assembly of FIG. 9.

Referring now to FIG. 10, another exemplary embodiment of a sensor assembly 356 is illustrated. In this embodiment, a torque rotor 490 is operably coupled with a rotor ring or torque substrate 436 while a position substrate 494 is operably connected to column shaft 154 via a collar 496 therebetween. Torque substrate 436 and position substrate 494 are substantially parallel and coaxially aligned with respect to axis 394 defining an axis of shaft 154. Torque substrate 436 and position substrate 494 are further aligned with each other via respective openings 500 and 502 having alignment pin 306 therethrough. It will be recognized by one skilled in the pertinent art that when alignment pin is removed from opening 500 and 502, substrates 436 and 494 rotate about axis 394 and with respect to each other to sense torque applied via a steering wheel connected to a torsion bar operably connected to torque rotor 490.

Substrates 436 and 494 are further housed in a housing 488 having interface 591 extending therefrom for electrical connection therewith. Housing 488 is C-shaped having an elongated aperture 504 configured in a top surface defining a top surface of three surfaces defining housing 488. It will be recognized that housing 488 may be any number of shapes and is not limited to a C-shaped housing as described above. Aperture 504 allows free floating movement of substrates 436 and 494 having pin 306 installed limited only by the dimensions defining aperture 504. In this manner, dimensional stack tolerances in housing 488 will not affect the required offset voltage when pin 306 is removed, because aperture 504 is configured as to not allow any stored mechanical energy therein by misalignment caused between openings 500, 502 and aperture 504.

In operation with respect to FIGS. 1–7, when the operator turns the steering wheel 152, the resulting torque input torsionally flexes the torsion bar 168. The rotor ring 236 rotates relative to the position rotor 194 such that the torque sensor brushes (not shown) slide along respective resistive patterns of the torque element. The operating range of the torque sensing unit is from about −8 to about +8 degrees, and the output voltage varies from about 0 to about 5 Volts having a required offset of about 50 percent +/−4.5 percent of Vcc. When Vcc is 5 Volts, for example, the required offset voltage is about 2.50 Volts+/−0.225 Volts. The potentiometer is a function of the resistances obtained from the resistive pattern obtained when rotor ring 236 rotates relative to the position rotor 194. With this information, the controller 159 can determine the magnitude of the torque input and send the appropriate bias and power to the servo motor 160 so that the electronic power steering system 150 provides the appropriate rotational direction and level of power assistance to aid in steering.

The circuits described hereinabove for the potentiometers are one operative preferred circuits, but other known potentiometer circuits could be used instead of the particular circuits described hereinabove.

It is therefore apparent from the foregoing description of the present invention that one advantage of this invention is that the sensing device is well adapted to large scale manufacturing, offers low cost, high durability, and high stability. In addition, the sensor allows for greater dimensional stack up tolerances that will not affect the required offset voltage after assembly and installation thereof in a vehicle steering system.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed are not to be construed as limiting to the claims.

What is claimed is:

1. A differential angular displacement sensing apparatus comprising:
    a shaft including a primary shaft coaxially connected to a secondary shaft;
    a first substrate operably coaxially coupled to said primary shaft, said first substrate oriented substantially perpendicular to an axis defining said shaft;
    a second substrate operably coaxially coupled to said secondary shaft, said second substrate oriented substantially perpendicular to said axis defining said shaft, said first and second substrates each having an aperture therethrough configured to receive an alignment pin therethrough, said first and second substrates being substantially parallel to each other defining an electrical interface therebetween, said electrical interface configured to generate a signal indicative of an amount of torque applied to said shaft; and
    a housing configured to enclose said first and second substrates having said electrical interface therebetween, wherein said housing includes an alignment aperture therethrough positioned to align with said apertures of said first and second substrates having said alignment pin therethrough and extending outside of said housing, said alignment aperture configured to limit contact of said alignment pin with edges defining said alignment aperture in said housing while allowing said alignment pin to align said apertures of said first and second substrates with said alignment aperture.

2. The apparatus of claim 1, wherein said alignment aperture is configured to allow entry of said alignment pin to align said apertures of said first and second substrates indicative of a predetermined offset voltage of said electrical interface without alignment pin storing any mechanical energy as a result of misalignment between said alignment aperture and said apertures of said first and second substrates.

3. The apparatus of claim 2, wherein said alignment aperture is configured to allow removal of said alignment pin without said predetermined offset voltage being affected by dimensional stack tolerances of said housing.

4. The apparatus of claim 3, wherein said alignment aperture is configured as an elongated slot such that said alignment pin can align said apertures of said first and second substrates without having contact with said edges defining said alignment aperture.

5. The apparatus of claim 4, wherein said alignment aperture is dimensioned larger than a periphery defining said alignment pin.

6. The apparatus of claim 4, wherein said elongated slot is arcuate to allow rotation of said first and second substrates about said axis relative to said housing limiting contact of said alignment pin extending therethrough with said edges defining said alignment aperture.

7. The apparatus of claim 1, wherein said secondary bar is a torsion bar.

8. The apparatus of claim 1, wherein said electrical interface between said first and second substrates is a potentiometer configured to generate a signal indicative of torque applied to said secondary shaft rotating said second substrate with respect to said first substrate.

9. The apparatus of claim 8, wherein said potentiometer includes a brush extending from said second substrate in electrical contact with a resistive pattern configured on said first substrate.

10. The apparatus of claim 1, wherein said shaft is a steering column shaft in operable communication with a steering hand wheel.

11. The apparatus of claim 1, wherein said alignment pin is installed during assembly of the torque sensor apparatus and removed after installation within a vehicle.

12. An automotive steering system comprising:
    a shaft linked to at least one of a set of road wheels and a steering hand wheel;
    a sensor connected to the shaft for sensing torque applied to the shaft and operative to provide as output a signal indicative of the applied torque;
    a controller in signal communication with the sensor and operative thereby to accept as input from the sensor the signal indicative of the torque applied to the shaft; and
    a motor coupled to the shaft and in signal communication with the controller and operative thereby to accept as input from the controller a command to apply torque to the shaft,
    wherein said sensor includes a first substrate operably coaxially coupled to a primary shaft of said shaft, said first substrate oriented substantially perpendicular to an axis defining said shaft;

a second substrate operably coaxially coupled to a secondary shaft coaxially connected to said primary shaft, said second substrate oriented substantially perpendicular to said axis defining said shaft, said first and second substrates each having an aperture therethrough configured to receive an alignment pin therethrough, said first and second substrates being substantially parallel to each other defining an electrical interface therebetween, said electrical interface configured to generate a signal indicative of an amount of torque applied to said shaft; and a housing configured to enclose said first and second substrates having said electrical interface therebetween, wherein one side of said housing includes an alignment aperture therethrough positioned to align with said apertures of said first and second substrates having said alignment pin therethrough and extending outside of said housing, said alignment aperture configured to limit contact of said alignment pin with edges defining said alignment aperture in said housing while allowing said alignment pin to align said apertures of said first and second substrates with said alignment aperture.

13. The system of claim 12, wherein said alignment aperture is configured to allow entry of said alignment pin to align said apertures of said first and second substrates indicative of a predetermined offset voltage of said electrical interface without alignment pin storing any mechanical energy as a result of misalignment between said alignment aperture and said apertures of said first and second substrates.

14. The system of claim 13, wherein said alignment aperture is configured to allow removal of said alignment pin without said predetermined offset voltage being affected by dimensional stack tolerances of said housing.

15. The system of claim 14, wherein said alignment aperture is configured as an elongated slot such that said alignment pin can align said apertures of said first and second substrates without having contact with said edges defining said alignment aperture.

16. The system of claim 15, wherein said alignment aperture is dimensioned larger than a periphery defining said alignment pin.

17. The system of claim 15, wherein said elongated slot is arcuate to allow rotation of said first and second substrates about said axis relative to said housing limiting contact of said alignment pin extending therethrough with said edges defining said alignment aperture.

18. The system of claim 12, wherein said secondary bar is a torsion bar.

19. The system of claim 12, wherein said electrical interface between said first and second substrates is a potentiometer configured to generate a signal indicative of torque applied to said secondary shaft rotating said second substrate with respect to said first substrate.

20. The system of claim 19, wherein said potentiometer includes a brush extending from said second substrate in electrical contact with a resistive pattern configured on said first substrate.

21. A method to maintain a predetermined voltage offset during assembly of a torque sensor assembly, the method comprising:

coaxially connecting a primary shaft with a secondary shaft;

operably connecting a first substrate coaxially with said primary shaft, said first substrate oriented substantially perpendicular to an axis defining said shaft;

operably connecting a second substrate coaxially with said secondary shaft, said second substrate oriented substantially perpendicular to said axis defining said shaft, said first and second substrates each having an aperture therethrough configured to receive an alignment pin therethrough, said first and second substrates being substantially parallel to each other defining an electrical interface therebetween, said electrical interface configured to generate a signal indicative of an amount of torque applied to said shaft; and configuring a housing to enclose said first and second substrates having said electrical interface therebetween, wherein one side of said housing includes an alignment aperture therethrough positioned to align with said apertures of said first and second substrates having said alignment pin therethrough and extending outside said housing, said alignment aperture configured to limit contact of said alignment pin with edges defining said alignment aperture in said housing while allowing said alignment pin to align said apertures of said first and second substrates with said alignment aperture.

22. A method to accommodate alignment between an aperture configured in each of a pair of substrates coaxially aligned in parallel and rotatable with respect to each other within a housing, the method comprising:

positioning an alignment aperture in said housing to substantially align with each aperture in said pair of substrates;

configuring said alignment aperture such that an alignment pin extending through and aligning each said aperture with said alignment aperture contacts edges defining each said aperture and limits contact with edges defining said alignment aperture;

disposing said alignment pin through each said aperture via said alignment aperture;

operably connecting a shaft to each of said pair of substrates; and removing said alignment pin extending outside said housing.

23. The method of claim 22, further comprising:

configuring an electrical interface between said pair of substrates, said electrical interface configured to sense a torque applied to one of said shafts.

24. The method of claim 23, wherein alignment of each said aperture on each of said pair of substrates with said alignment aperture creates an offset voltage potential in said electrical interface to measure torque applied to said one of said shafts.

* * * * *